Nov. 19, 1957 P. McDONALD 2,813,590
METHOD AND APPARATUS FOR PULSED ACOUSTIC WELL LOGGING
Filed July 21, 1951 4 Sheets-Sheet 1

PAT McDONALD
INVENTOR.

BY D. Carl Richards
AGENT

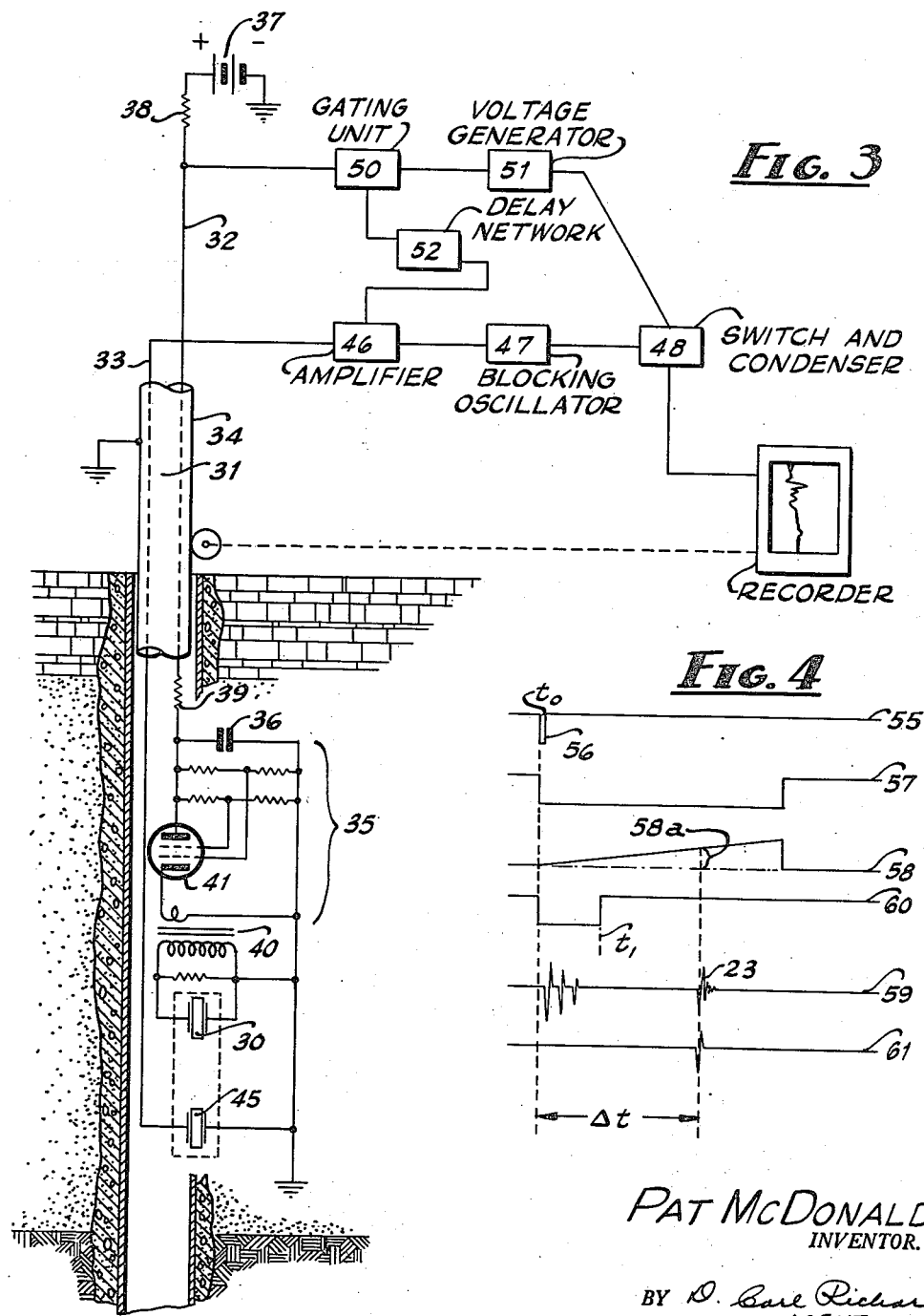

Pat McDonald
INVENTOR.

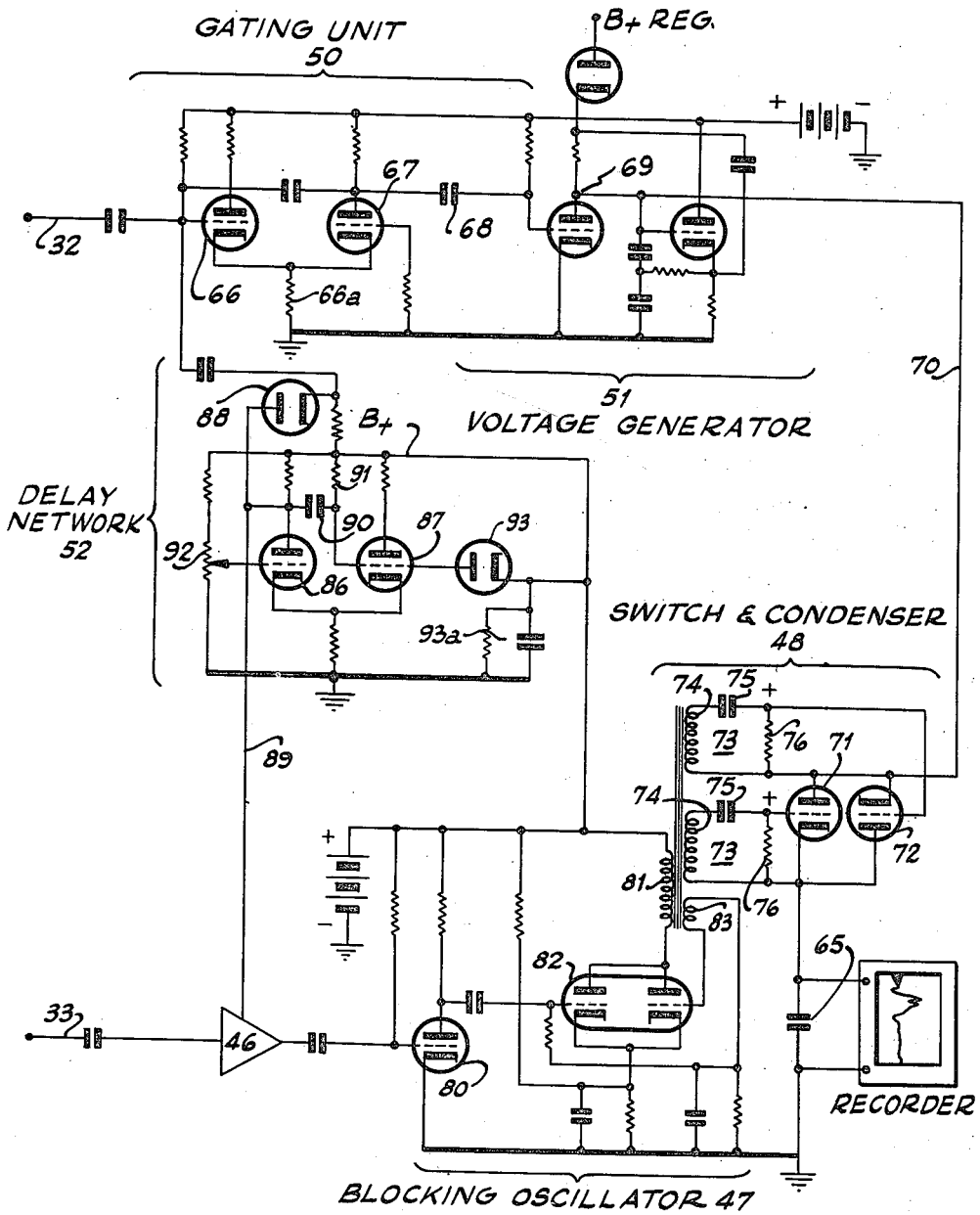

United States Patent Office 2,813,590
Patented Nov. 19, 1957

2,813,590

METHOD AND APPARATUS FOR PULSED ACOUSTIC WELL LOGGING

Pat McDonald, Oklahoma City, Okla.

Application July 21, 1951, Serial No. 237,941

7 Claims. (Cl. 181—.5)

This invention relates to the study of formations adjacent the walls of a bore hole and more particularly to acoustic well logging where regions characterized by a contrast in acoustic impedance horizontally displaced from a given point of investigation and vertical in extent are detected and logged.

Generally in acoustic well logging a transmitter is movably suspended in a well bore and receiving means spaced from the transmitter detect acoustic energy from the transmitter. There are a number of known modes of generating the acoustic energy, of coupling the acoustic energy to the formation, and of measuring a resultant acoustic effect that is controlled by or related to the acoustic properties of the formations.

The present invention relates to a new mode of operation wherein discrete acoustically contrasting effects displaced laterally from the bore hole are detected by utilizing sharp acoustic pulses transmitted generally perpendicularly from the bore hole to the point at which the contrast exists and the energy reflected from that point is measured. The disturbances produced in the formations by drilling and conditioning of a well bore are utilized to determine the nature of characteristics of the formations such as the fluid content, the permeability and the homogeneity, etc.

More particularly, fluids filtered from drilling mud penetrate any permeable strata pierced by a bore hole, displacing the neutral formation fluid. Where a relatively sharp zone or interface exists between such fluids vertical in extent at a given radius from the bore hole, defining the extent of the penetration of the drilling fluids into the formation, acoustic pulses may be directed to and reflected from such an interface to determine the nature of the formation and the fluids therein. For example, if a permeable oil or gas saturated formation is encountered and the drilling fluid filtrate displaces the oil or gas, there will exist a change in the over-all density at succeedingly greater distances away from the bore hole. The effect produced is a change in the acoustic impedance of the formation. If the formation initially is homogeneous, the interface may be vertical and relatively sharp. This change in acoustic impedance produced by drilling or other operations may be utilized for production of an indication of the character and the hydrocarbon contents of the formations. On the other hand, if a porous water bearing strata is encountered, the drilling mud filtrate penetrating such formation will displace the formation water and there will be but slight, if any, acoustic interface between the filtrate and the formation water because the density contrast is negligible.

For a more complete understanding of the present invention and further objects and advantages thereof, reference may now be had to the following description taken in conjunction with the accompanying drawings in which:

Fig. 3 is a block diagram of the system for measuring selected reflections;

Fig. 4 illustrates the sequence of the operations in the system of Fig. 3;

Fig. 5 is a detailed circuit diagram of the system of Fig. 3;

Figure 1:
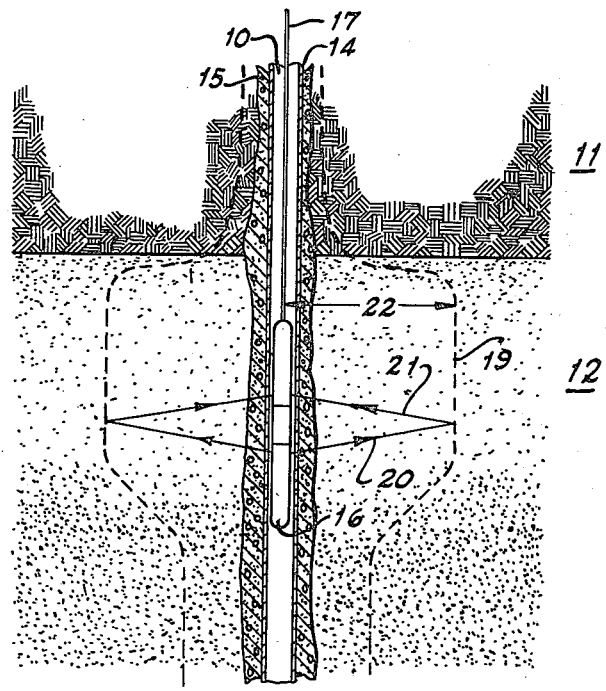
Fig. 1 illustrates well logging in accordance with the present invention.

Referring now to Fig. 1, a section of a bore hole 10 is illustrated as extending from an upper shale formation 11 through a permeable sand 12. A casing 14 is embedded in a cement sheath 15 and extends through the length of the bore hole 10. An acoustic logging device 16 is illustrated as suspended by a cable 17 and positioned at a point in the bore hole 10 adjacent the permeable formation 12. In accordance with the present invention sharp acoustic pulses are periodically generated by the device 16 and transmitted laterally along path 20 to an interface 19 at which point a portion of the energy is reflected and returns along path 21 to the device 16. The time interval between pulse generation and reception is measured, utilizing the energy traveling along the paths 20 and 21 to produce a log that may be calibrated in terms of the distance 22 as a function of bore hole depth.

In formations known to be characteristic of oil production in many fields, the distance 22, extends from a few inches to 15 or 20 feet. If the formation is substantially homogeneous, porous and permeable, the vertical interface cylindrical in shape and symmetrical with respect to the bore hole will be relatively sharp and capable of producing such reflections. Variations in the permeability from strata to strata or in a single strata may thus be determined.

The present invention is directed specifically to the study of acoustic reflecting interfaces that exist beyond selectable minimum distances from the axis of the bore hole. Where such interfaces exist between drilling mud filtrate and oil or gas naturally in the formation, logs may be produced that not only portray permeability but also are selectively indicative of the presence of the oil or gas in a porous formation as contrasted with the presence of water in a similar formation since the difference in density determines the presence or absence of such an interface.

In the bore hole section illustrated in Fig. 1 it will be apparent that there are interfaces in addition to the one above discussed from which energy will be reflected. For example, a portion of the energy traveling from the device 16 upon generation of an acoustic pulse will be reflected at the inner surface of the casing 14, from the outer surface of the casing 14 and from the wall of the bore hole.

Figure 2:
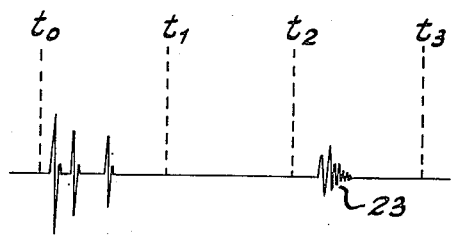
Fig. 2 represents a time display of pulses received in the system illustrated in Fig. 1.

The reflections illustrated in Fig. 2 represent a cathode ray presentation wherein pulse amplitude is directly proportional to the amplitude of the received pulse amplitude and the horizontal sweep is a measure of time with zero time coinciding with the instant of generation of the acoustic pulse. The three pulses in the interval $t_0$ to $t_1$ represents two reflections from the casing and one reflection from the bore hole wall.

In accordance with one aspect of the present invention the information in the detected pulses of Fig. 2 may be reduced to recordable and useful information by counting the number of received pulses following each transmitted pulse. If in nonpermeable shale sections, three pulses are consistently produced, lowering or raising the instrument to a level at which four pulses are produced would indicate directly the presence of the new reflecting interface, the new reflection being subject to interpretation in terms of lithology and bore hole conditions as above suggested.

In accordance with another aspect of the present invention, the reflected pulses arriving in the interval immediately following the generation of a transmitted pulse, i. e. in the interval $t_0$ to $t_1$, will be obliterated so that only the pulse 23 reflected from the interface 19, when present, will be effective in the measuring circuit. When such is the case, the time interval between generation of a pulse and reception of pulse 23 may be measured and reproduced as a continuous log (1) of time interval ($\Delta t$) versus depth, or (2) if suitably corrected, as a continuous log of the distance 22 as a function of bore hole depth.

A plurality of logs may be obtained by selecting the obliterating point at times $t_1$, $t_2$ and $t_3$ in which there will be succeedingly decreasing degrees of resolution or, stated otherwise, in which only when the interface 19 is farther and farther from the bore hole 10 will a reflection be transmitted to measuring circuit means. The log produced when the receiving circuit is inoperative from the time $t_0$ until time $t_1$ would permit location of formations having relatively low permeability. Logs produced using times $t_2$ and $t_3$ would contain information relating only to more permeable formations.

Having described the principle upon which the present invention is based, reference may now be had to Fig. 3 in which there is illustrated a system for carrying out the foregoing operations. The system is similar in some aspects to the system forming the subject matter of copending application Serial Number 192,750, filed October 28, 1950, of Gerald C. Summers for a "Velocity Well Logging System," now Patent No. 2,704,364, but differs materially both in construction and operation.

Acoustic pulses are generated by periodic application of a voltage pulse to a crystal 30. Cable 31 supports a bore hole unit including crystal 30 in the well bore and electrically connects it to surface measuring and recording equipment. In the form illustrated, cable 31 includes inner conductors 32 and 33, and an outer conducting sheath 34. A tension bearing member (not shown) may also be included.

The crystal 30 is excited by pulses from a circuit 35 which in the form illustrated is a relaxation oscillator in which a condenser 36 is charged from a voltage source generically represented by the battery 37 which may or may not be located at the surface of the earth. The charging circuit for condenser 36 includes resistor 38, conductor 32 and resistor 39. The oscillator circuit includes the primary winding of a transformer 40 connected in series with the condenser 36 and the anode-cathode impedance of a gas filled, cold cathode tetrode 41. The condenser 36 is discharged repeatedly and periodically through the primary of the transformer 40 and through the tube 41 to produce a voltage pulse in the transformer 40. The condenser discharge or pulse repetition rate depends upon the time constants of the circuits connected to the control and screen grids of tube 41 and to the condenser 36.

The secondary winding of the transformer 40 is connected directly to the terminals of the crystal 30. A variation in the voltage across the crystal 30 produces a change in its physical dimensions which generates an acoustic impulse in the media adjacent thereto.

A receiver generically illustrated by the crystal 45 is housed with or carried closely adjacent the transmitting crystal 30 for reception of acoustic energy following the generation of pulses by the transmitter 30. Upon receipt at the crystal 45 of such pulses as are illustrated in Fig. 2, a series of voltage pulses corresponding thereto are produced and are transmitted by way of conductor 33 to surface recording equipment. The portion of the system located at the surface of the earth and shown in Fig. 3 in block form measures accurately and records the interval of time between the generation of a pulse by the crystal 30 and the reception of a pulse such as pulse 23, Fig. 2, reflected from an acoustic interface displaced from the axis of the bore hole, to the exclusion of unwanted pulses such as in the interval $t_0$ to $t_1$, Fig. 2, produced by effects closely adjacent the bore hole.

The supporting structure for the crystal 30 has not been shown but preferably will be of the type generically illustrated in my copending application for an "Acoustic Well Logging System," Serial Number 181,284, filed August 24th, 1950, now Patent No. 2,722,282.

The surface system includes an amplifier 46 which is connected to a switch 48 by way of a converting unit 47 which for the purpose of the present description is a blocking oscillator. As will further be explained in connection with Figs. 4 and 5, the switch 48 has associated therewith a capacitive element that is charged to a voltage proportional to the interval of time between generation of a pulse between crystal 30 and the reception of the reflected pulse 23.

The foregoing is accomplished by providing a gating unit 50 connected by way of conductor 32 to the oscillator 35 and responsive to the electrical pulse generated thereby. The gating unit 50 is coupled directly to the unit 51 to initiate the generation of a voltage which changes monotonically (i. e. without change of sign of the slope thereof), preferably one that increases linearly from an initial value following the instant of generation of the pulse by the crystal 30.

The gating unit 50 is also coupled to amplifier 46 by way of a delay network 52 to block amplifier 46 for a selected interval immediately following the generation of the pulse by crystal 30, for example the interval from $t_0$ to $t_1$, Fig. 2.

The operation of the system of Fig. 3 is illustrated by the series of diagrams of Fig. 4. All of the graphs of Fig. 4 have time plotted as abscissae, with zero time corresponding to generation of a pulse by oscillator 35. More particularly, the graph 55 illustrates the voltage applied to the transformer 40 wherein sharp pulse 56 at time $t_0$ represents the instant of discharge of condenser 36. The pulse 56 applied to the gating unit 50, Fig. 3, produces an abrupt change in the output voltage of gating unit 50. The output voltage applied to the voltage generator is represented by the graph 57.

The graph 58 represents the output voltage of generator 51. This voltage is a monotonically changing function, preferably a linearly changing function with time from $t_0$. The output of the voltage generator 51 is applied to the switch and condenser unit 48 and is utilized to charge a condenser in the unit 48 to the value of the voltage 58 at a time dependent upon a triggering pulse applied to amplifier 46.

More particularly, assume that the first three pulses are eliminated or blocked and that only pulse 23 passes through the amplifier 46 by operation of the delay network 52 whose output (graph 60) is applied to control the gain of amplifier 46. When the amplifier 46 is opened at time $t_1$, the pulse 23 may be transmitted therethrough to the blocking oscillator 47. The blocking oscillator produces a single voltage pulse 61 effective at the switch and condenser unit 48 momentarily to close the switch to permit the associated condenser to be charged to the value 58a of the graph 58. If the path 20—21, Fig. 1, increases in length, the voltage 58 reaches a higher value before switch 48 is actuated. The opposite is also true. Thus the voltage on the condenser in the switch unit 48 is proportional to the length of the pulse travel path 20—21.

Fig. 5 is a detailed circuit diagram of the surface units of the system of Fig. 3. Where consistent, parts have been given the same reference characters as in Fig. 3. It will be helpful, in understanding the operation of this system to remember that the voltage on the condenser 65 is to be maintained directly proportional to the time interval $\Delta t$, Fig. 4.

The gating unit 50 is a "single shot" or monostable multivibrator. The tube 66 of multivibrator 50 normally conducts and tube 67 normally is shut off or non-conductive. Upon application of pulse 56, Fig. 4, to the grid of tube 66 in such polarity as to drive it negative, the anode-cathode current is reduced which lowers the voltage across the common cathode resistor 66a thereby initiating current flow through tube 67. The sudden change in the voltage on the plate of tube 67 is coupled to the voltage generator 51 by way of the condenser 68. This voltage has the form illustrated by the graph 57, Fig. 4. For a more detailed description of the construction and operation of unit 50, reference may be had to Wave Forms, volume 19, of the M. I. T. Radiation Laboratory Series, McGraw-Hill, 1949, section 5.5, page 166.

Figure 7:
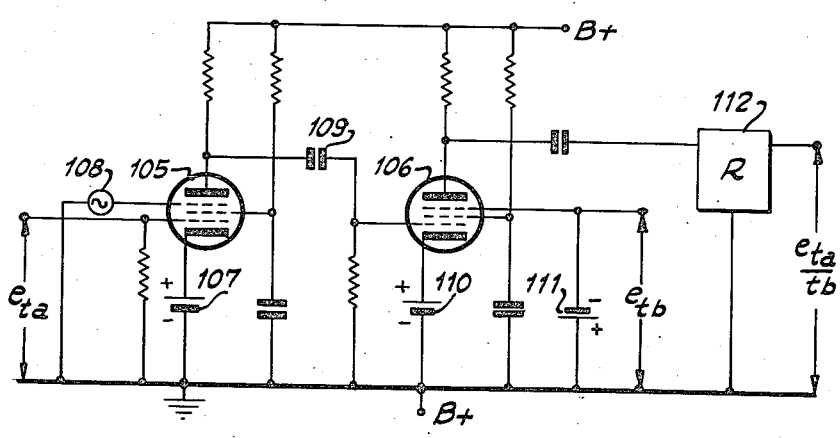
Fig. 7 is a detailed circuit diagram of a portion of the system of Fig. 6.

The voltage generator 51 generically illustrates a device for producing a voltage which changes with time from a predetermined initial value following an initiating pulse. In the form illustrated, the circuit is known in the art as a boot strap linear sweep generator with a compensating network. This system is described in detail in the above-identified M. I. T. reference, Wave Forms, at page 277, taken with Fig. 7.23. In such system the voltage between point 69 and ground rises linearly following the application of the pulse 57 output from tube 67. This linearly rising voltage appearing at point 69 is applied by way of conductor 70 to the switch and condenser unit 48.

The switch and condenser unit 48 includes a double triode clamp in which the anode of tube 71 is connected directly to the cathode of tube 72. Similarly, the anode of tube 72 is coupled directly to the cathode of tube 71. The voltage appearing at point 69 and connected to the double triode clamp by way of conductor 70 is applied through the double triode clamp to the condenser 65. The grids of tubes 71 and 72 are connected to their respective cathodes by way of identical grid circuits 73. Each grid circuit includes a secondary winding 74 of a pulse transformer connected to the cathode and to the grid through a condenser 75. Resistors 76 are connected between grid and cathode. The voltage on the condensers 75 in the condenser-resistor combinations 75 and 76 normally maintains the tubes 71 and 72 non-conductive. However, when suitably pulsed through transformer secondaries 74, the tubes 71 and 72 momentarily are rendered conductive, effectively as a switch, to permit current to flow to or from the condenser 65. More particularly, current flows to or from point 69 in the circuit which includes the condenser 65, depending upon the sign of the algebraic sum of two voltages, (1) the voltage output of generator 51 and (2) the residual voltage on condenser 65. Since the double triode clamp is conductive following generation of each acoustic pulse, the charge on condenser correspondingly is adjusted so that, as seen by the recorder, the condenser voltage is unidirectional in character and of variable magnitude.

More particularly, the pulse 23 is utilized exclusively in one aspect of the invention to control the path of current flow through the switch and condenser unit 48. The path is normally "open circuited" and prohibitive of current flow. Responsive to pulse 23, the path is repeatedly momentarily closed to permit current flow. Pulse 23 is transmitted through amplifier 46 to the input tube 80 of the blocking oscillator 47. The oscillator 47 produces a single output voltage oscillation or pulse in response to an input pulse. The application of the pulse from the tube 80 to the first grid of the blocking oscillator 47 produces a single cycle of current variation in the transformer primarily 81 connected in the plate circuit of the double triode 82. The pulse transformer has an additional winding 83 which is utilized to control the action of the blocking oscillator 47. The polarity of the pulses applied to the grids of tubes 71 and 72 is made the same as the grid polarity of the oscillator tube 82 and opposite to the polarity of the plate voltage on the tube 82.

Thus when pulse 23 is applied to tube 80, a single pulse is induced in the secondary windings 74 which momentarily drives the grids of tubes 71 and 72 sufficiently positive to permit conduction therethrough. The voltage across the condenser 65 remains constant as long as the interval $\Delta t$ is constant. The voltage across condenser 65 is coupled to the recorder by way of a high impedance input circuit such as a cathode follower stage (not shown) so that changes in the time interval $\Delta t$, as represented by variations in the voltage across condenser 65, may be recorded without leakage of the charge through the recording instrument.

The delay network 52 actuated by the voltage pulse 56, Fig. 4, blocks the amplifier 46 for a selected interval immediately following the generation of pulse 56. The delay network 52 is a cathode coupled monostable multivibrator typical of the type illustrated and described in the above-identified M. I. T. reference Wave Forms, page 168, etc. and illustrated in Fig. 5.12. The voltage pulse 56 is applied to the anode of tube 86 by way of the diode 88. The negative pulse injected through tube 88 turns tube 87 off which action initiates conduction through tube 86. The length of time tube 86 conducts is a linear function of the voltage on the grid of tube 87. This voltage varies following energization of tube 86 at a rate depending upon the time constant of circuit including condenser 90 and resistor 91. Also, the duration of conduction in tube 86 is a substantially linear function of the voltage impressed on its grid. Thus the potentiometer 92 is a direct and readily variable control of the interval tube 86 conducts. Diode 93 and the R-C circuit 94 controls the initial level of the voltage on the grid of tube 87.

It will now be apparent that potentiometer 92 may be adjusted to control which of the pulses illustrated in the graph 59, Fig. 4, are to be effective in the control of the voltage on condenser 65. The potentiometer 92 is adjusted for conduction through tube 86 following generation of each acoustic pulse for a time interval at least equal to twice the time of travel of a pulse from the transmitter to the wall of the bore hole so that amplifier 46 is blocked during reception of any reflected energy from either the casing or the bore hole well.

Amplifier 46 has not been shown in detail, but preferably is of the type capable of abrupt suppression of current flow without the production of a voltage pulse resulting from the change in gain. Suitable circuits that may be used are illustrated in Patents 2,515,456 and 2,497,835 issued to George B. Loper. In the systems there disclosed, the gain of the signal channel may be abruptly suppressed without modulation resulting from the gain suppression action. For example, in the former patent the circuit shown in Fig. 5 would be suitable. Similarly, the circuit of Fig. 4 in the latter patent may be utilized.

Figure 6:
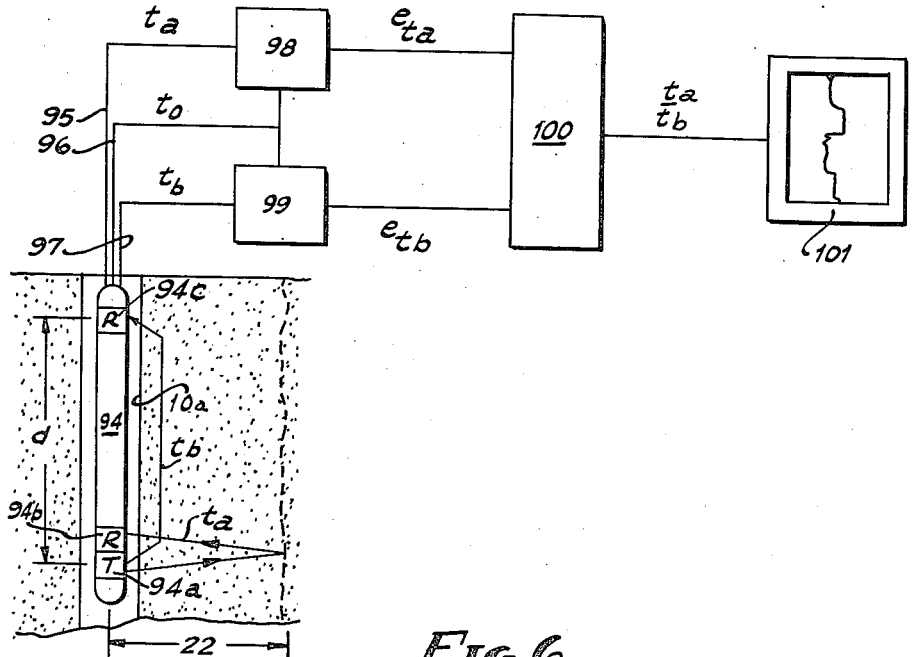
Fig. 6 is a further modification of the present invention.

In Fig. 6 there is illustrated a modification of the invention in which there is produced a distance log, in contrast to the time log above discussed. The distance 22 from the center of the bore hole to the reflecting interface is charted as a function of depth of the bore hole exploring unit. In this system, an exploring unit 94 is movably positioned in an uncased bore hole 10a. A pulse transmitter 94a is positioned at the lower end of the unit 94. A receiver 94b is positioned immediately adjacent transmitter 94a. A second receiver 94c is located at a distance $d_1$ vertically above the transmitter 94a. The elements 94a, 94b and 94c are suspended in the bore hole 10a and attached to surface equipment by way of electrical circuits represented by the three channels 95, 96 and 97.

Pulses travel from transmitter 94a to a horizontally displaced reflecting interface and back to the receiver 94b whereupon electrical pulses are generated. The electrical pulses are conducted to the surface by way of channel 95 and applied to a voltage generating device 98. Similarly, pulses traveling from the transmitter 94a to the upper receiver 94c produce an electrical pulse at a time after the generation directly proportional to the velocity of an acoustic pulse in the adjacent formation. The latter electrical pulse is applied by way of channel 97 to a second voltage generating device 99. The devices 98 and 99 are both coupled to the transmitter by way of channel 96 for transmission therebetween of electrical pulses coincident in time with generation of each acoustic pulse.

The device 98, in the manner above described in connection with Fig. 5, produces a voltage proportional to the distance from the transmitter 94a to the reflecting interface and inversely proportional to the velocity of the formation. The device 99 similarly produces a second voltage proportional to the travel time from transmitter 94a to receiver 94c. Both voltages thus produced are applied to a ratio unit 100 whose output is a voltage proportional to the ratio of the time intervals $$\frac{t_a}{t_b}$$

This voltage is then applied to the recorder 101 which records a function which is equal to a constant multiplied by the distance 22 and thus is a direct log of the permeability of the formations. The log thus produced is similar to that produced by the system of Fig. 1 except it is corrected for variations in the velocity characteristic of the formations.

As above indicated the devices 98 and 99 may be identical in construction and operation with that disclosed in Fig. 5. The ratio device 100 may be of the form illustrated in Fig. 7, where two pentodes 105 and 106 are utilized to produce an output voltage proportional to the ratio of the two input voltages $e_{t_a}$, $e_{t_b}$. The output voltage $e_{t_a}$ from device 98 is applied to the control grid of the pentode 105 which is normally biased by a suitable means such as a cathode connected battery 107. Tube 107 preferably is a sharp cutoff amplifying tube biased approximately to cutoff by the battery 107. The voltage $e_{t_a}$ is applied to the grid circuit of tube 105 to oppose battery 107. An alternating current signal of constant magnitude is applied to the suppressor grid of tube 105 from a source 108 causing an alternating current output signal to appear in the plate circuit. The magnitude of this signal is directly proportional to the magnitude of the voltage $e_{t_a}$. The voltage from the anode is coupled by way of condenser 109 to the signal grid of the second pentode 106.

Pentode 106 is biased for normal amplification by the battery 110. The suppressor grid is maintained slightly negative by the battery 111. The second voltage $e_{t_b}$ is applied to the suppressor grid in sense further to drive the suppressor grid negative in proportion to the magnitude of the voltage $e_{t_b}$. The pentode 106 preferably is of the remote cutoff amplifying type having transconductance characteristic of the range of variations of voltage $e_{t_b}$ that is an inverse function, i. e. in which plate current increases inversely proportional with respect to the grid voltage. It will be remembered that the voltage $e_{t_b}$ is inversely proportional to the velocity of the formation through which it passes. Formation velocities may vary from 5,000 feet per second to as high as 20,000 feet per second giving a range of voltage variation of four to one. There are a number of tubes commercially available that have such a transconductance characteristic over such a limited range and will be readily chosen by one skilled in the art from an inspection of such characteristic curves.

The alternating current signal appearing on the anode of tube 106 will increase directly in magnitude as the first input voltage $e_{t_a}$ and will be inversely proportional to the second voltage $e_{t_b}$. A rectifier R (shown in block form) connected to the anode of tube 106 converts the alternating current output to direct current for energizing a suitable recording device. While the ratio producing circuit above described may be found to be suitable, other forms of ratio producing devices may be utilized, the foregoing being presented by way of example and not by way of limitation.

Thus in accordance with the present invention, there is provided a transmitter and a receiver positioned in a bore hole closely adjacent one another. The vertical separation preferably will be maintained at a minimum, so that pulses may travel vertically in from the transmitter and receiver in a time that is shorter than the travel time by way of the reflection path. As a result pulses reflected from horizontally displaced vertically extending interfaces only are logged and undesired pulses inherently associated with the environment in which the device operates are eliminated.

In order to provide the necessary resolution it will be apparent that pulses of short duration must be generated. Piezo-electrical crystals are particularly suitable. Cylindrical crystals made of barium titanate have been found to be particularly suitable when pulsed and damped as to be non-resonant and when positioned with the longitudinal axis of the cylinder parallel to the axis of the well bore. Depending upon the particular crystals used, the housing or supporting structure associated therewith may be designed to be non-resonant thereby to prevent ringing often encountered in acoustic pulse generating devices. Such provisions when designed as herein suggested may readily be made, since the fundamental principles of damping and mounting such structures are well understood by those skilled in the art.

While particular embodiments of the invention have been illustrated and described, it will be understood that further modifications will now suggest themselves to those skilled in the art. It is therefore intended to cover such modifications of the invention as fall in the scope of the appended claims.

What is claimed is:

1. A horizontally ranging logging system for locating an interface between formation fluids and invading fluids which comprises an acoustic pulse generator movably positioned in a well bore, means for periodically exciting said generator for production of sharp spaced acoustic pulses, a receiver positioned closely adjacent said generator for reception of acoustic pulses, a measuring system having two input circuits and an output circuit, a conducting path interconnecting said generator and a first of said input circuits for applying a reference pulse thereto coincident with the generation of each of said acoustic pulses, a second conducting path interconnecting said receiver and the second of said input circuits for applying electrical pulses thereto corresponding to acoustic pulses impinging said receiver, means including a voltage generator coupled to said first input circuit for producing a voltage that varies with time following each of said reference pulses, a storage element, switching means coupled to said second input circuit momentarily to apply said voltage to said storage element responsive to the electrical pulse output of said receiver and delay means interconnecting said input circuits and responsive to said reference pulses for blocking said switching means for predetermined intervals after generation of each acoustic pulse.

2. A horizontally ranging logging system for locating an interface between formation fluids and invading fluids which comprises an acoustic pulse generator movably positioned in a well bore, means for periodically exciting said generator for production of sharp spaced acoustic pulses, a receiver positioned closely adjacent said generator for reception of acoustic pulses, a measuring system having two input circuits and an output circuit, a conducting path interconnecting said generator and a first of said input circuits for applying a reference pulse thereto coincident with the generation of each of said acoustic pulses, a second conducting path interconnecting said receiver and the second of said input circuits for applying electrical pulses thereto corresponding to acoustic pulses impinging said receiver, means including a voltage generator coupled to said first input circuit for producing a voltage that varies with time following each of said reference pulses, a storage element, switching means coupled to said second input circuit momentarily to apply said voltage to said storage element responsive to the electrical pulse output of said receiver and delay means having an selectively variable control interconnecting said input circuits and responsive to said reference pulses for blocking said switching means for predetermined intervals after generation of each acoustic pulse.

3. A horizontally ranging logging system for locating an interface between formation fluids and invading fluids which comprises an acoustic pulse generator movably positioned in a well bore, means for periodically exciting said generator for production of sharp spaced acoustic pulses, a receiver positioned closely adjacent said generator for reception of acoustic pulses, a measuring system having two input circuits and an output circuit, a conducting path interconnecting said generator and first of said input circuits for transmitting a reference pulse therebetween coincident with the generation of each of said acoustic pulses, a second conducting path interconnecting said receiver and the second of said input circuits for transmitting electrical pulses therebetween coinciding in time with the arrival of acoustic pulses at said receiver, means including a voltage generator coupled to said first input circuit for producing a voltage that varies with time following each of said reference pulses, a storage element, switching means coupled to said second input circuit momentarily to apply said voltage to said storage element responsive to the electrical pulse output of said receiver and delay means having a time constant greater than twice the time of travel of a pulse from said transmitter to the wall of said bore hole interconnecting said input circuits and responsive to said reference pulses to render said switching means sensitive only to received pulses reflected from points displaced from said receiver distances greater than the radius of said well bore.

4. In a well logging system for locating an interface between formation fluids and invading fluids including a generator of sharp spaced acoustic pulses and a pulse receiver positioned in a well bore the improvement which comprises means for maintaining said transmitter and receiver in close physical proximity, a measuring system having an output circuit and two input circuits respectively connected to said transmitter and said receiver, a circuit connected to one of said input circuits for repeatedly generating a linearly changing voltage in response to each electrical pulse from said transmitter, a condenser connected to said output terminals, means including a switch connected to the second of said input circuits responsive to electrical pulses from said receiver momentarily to connect said condenser to said voltage generating circuit for charging said condenser, means responsive to the electrical output of said transmitter for rendering the switching means inoperative for a time interval after generation of each acoustic pulse greater than twice the time of travel of an acoustic pulse from said transmitter to the wall of said well bore and means for recording the voltage across said condenser at said output terminals as a function of depth of said transmitter and receiver in said well bore.

5. A system for logging the distance to a vertically disposed acoustic interface in the formations adjacent an uncased well bore which comprises an acoustic pulse transmitter movably positioned in a well bore, electrical pulse generating means connected to said transmitter for periodically exciting said transmitter to produce sharp acoustic pulses for transmission to formations adjacent said well bore, a first pulse receiver positioned immediately adjacent said transmitter and supported therewith for movement in said well bore, a second pulse receiver positioned remote from said transmitter and movable therewith in said well bore, a pair of measuring units each having two input circuits and one output circuit, means electrically interconnecting said transmitter and one of the input circuits of both said units for transmission therebetween of voltage pulses coincident in time with the generation of each acoustic pulse, a circuit interconnecting said first receiver and one input circuit of the first of said units for transmission therebetween of electrical pulses coincident in time with the arrival at said first receiver of horizontally traveling acoustic pulses reflected from said interface receiver, a circuit interconnecting said second receiver and the input circuit of the second of said units for transmission therebetween of an electrical pulse coincident in time with the arrival at said second receiver of a pulse traveling vertically through said formation, delay means having an input responsive to the electrical output of said transmitter and an output connected to the first of said units for rendering said unit insensitive for time intervals following generation of each acoustic pulse equal to twice the travel time of an acoustic pulse from said transmitter to the wall of said well bore, means in said first and second units for producing indications at their output circuits respectively proportional to the time interval between generation of acoustic pulses and reception of pulses by said receivers, means for converting said indications into a single quantity proportional to the ratio thereof and means for charting said quantity as a function of the depth of said transmitter and receivers in said well bore.

6. The method of logging formations adjacent a well bore which comprises transmitting from within said well bore sharp time spaced acoustic pulses which travel laterally from said bore hole and are reflected at laterally disposed acoustic interfaces to produce in said bore hole pressure variations corresponding with energy reflected from said laterally disposed interfaces, selectively generating on a time basis with respect to reflections from the wall of said bore hole an indicia of the travel time of said pulses to a reflecting interface between invading fluids and natural formation fluids located with respect to the point of generation on the opposite side of said wall of said bore hole, and continuously moving the point of generation along the length of said bore hole to produce variations in said indicia proportional to changes in the radial position of said reflecting interface with respect to said point of generation as a function of bore hole depth.

7. The method of determining variations in the character of formations adjacent a well bore which comprises generating at each of a plurality of points within and spaced along the length of a well bore sharp acoustic pulses, generating a physical condition which monotonically varies beginning at a predetermined value coincident with the generation of each of said sharp acoustic pulses, and selectively sensing on a time separation basis with respect to reflections from the wall of said well bore the magnitude of said condition at the instant of the arrival in said well bore of acoustic energy reflected from the interface beyond said wall and between natural fluids in said formation and fluids introduced into said formation during the drilling of said well bore.

References Cited in the file of this patent
UNITED STATES PATENTS

| | | |
|---|---|---|
| 2,003,780 | Born | June 4, 1935 |
| 2,156,052 | Cooper | Apr. 25, 1939 |
| 2,200,476 | Mounce | May 14, 1940 |
| 2,231,243 | Beers | Feb. 11, 1941 |
| 2,446,960 | Seebinger | Aug. 10, 1948 |
| 2,631,270 | Goble | Mar. 10, 1953 |
| 2,704,364 | Summers | Mar. 15, 1955 |